US006715945B2

(12) United States Patent
Yamamoto et al.

(10) Patent No.: US 6,715,945 B2
(45) Date of Patent: Apr. 6, 2004

(54) PRINTING APPARATUS FOR PERFORMING QUALITY CONTROL OF PRINTED PAPER SHEET

(75) Inventors: Takaharu Yamamoto, Kyoto (JP); Yoshikazu Koyanagi, Kyoto (JP); Kunio Muraji, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 10/265,239

(22) Filed: Oct. 7, 2002

(65) Prior Publication Data

US 2003/0066446 A1 Apr. 10, 2003

(30) Foreign Application Priority Data

Oct. 10, 2001 (JP) .................................... P2001-312868

(51) Int. Cl.[7] .......................... B41J 2/315; B41J 11/42; B41F 31/00; B41F 13/24; G06F 15/00

(52) U.S. Cl. .................. 400/120.09; 400/582; 101/335; 101/232; 101/235; 101/350.4; 101/365; 358/1.9

(58) Field of Search ........................... 400/120.09, 582; 358/1.9; 101/335, 365, 484, 232, 233, 350.4

(56) References Cited

U.S. PATENT DOCUMENTS

| | | | | | |
|---|---|---|---|---|---|
| 3,567,923 | A | * | 3/1971 | Hutchison | 101/484 |
| 3,835,777 | A | * | 9/1974 | Krygeris | 101/350.4 |
| 4,448,121 | A | | 5/1984 | Uno et al. | 101/76 |
| 5,148,747 | A | * | 9/1992 | Rodi et al. | 101/450.1 |
| 5,182,721 | A | | 1/1993 | Kipphan et al. | 382/112 |
| 5,384,859 | A | | 1/1995 | Bolza-Schunemann et al. | 382/112 |
| RE35,495 | E | | 4/1997 | Bolza-Schuenemann et al. | 101/232 |
| 5,724,437 | A | * | 3/1998 | Bucher et al. | 382/112 |
| 5,907,999 | A | * | 6/1999 | Lusar et al. | 101/484 |
| 6,041,708 | A | | 3/2000 | Kipphan et al. | 101/365 |
| 6,119,594 | A | * | 9/2000 | Kipphan et al. | 101/365 |
| 6,446,555 | B1 | * | 9/2002 | Schramm et al. | 101/365 |
| 6,491,458 | B2 | * | 12/2002 | Hori et al. | 400/582 |
| 6,499,402 | B1 | * | 12/2002 | Sikes et al. | 101/484 |
| 6,539,863 | B2 | | 4/2003 | Shiraishi | 101/365 |

FOREIGN PATENT DOCUMENTS

| | | |
|---|---|---|
| EP | 0 461 338 A1 | 12/1991 |
| EP | 1 136 266 A1 | 9/2001 |
| JP | 6-210835 | 8/1994 |
| JP | 2824334 | 9/1998 |

* cited by examiner

*Primary Examiner*—Andrew H. Hirshfeld
*Assistant Examiner*—Wasseem H. Hamdan
(74) *Attorney, Agent, or Firm*—McDermott, Will & Emery

(57) ABSTRACT

A printing apparatus includes an image reader for reading an image on a printed paper sheet to obtain image data, and a controller for controlling the image reader to obtain image data about a color chart including solid patches once for every predetermined number of printed sheets or at every predetermined time interval which is inputted and set. The controller processes the image data to compute a printed density of each solid patch. Measurement data including the printed density are sequentially stored in a storage section in association with the number of printed sheets or time. The measurement data stored in the storage section may be displayed by a display section or outputted to a print section in the form of history data indicating measurement data transitions. Thus, the printing apparatus including a device for measuring printed sheets can perform history management on the measurement data for every predetermined number of printed sheets or at every predetermined time interval.

9 Claims, 7 Drawing Sheets

| THE NUMBER OF PRINTED SHEETS | KEY 1 | KEY 2 | ··· | KEY n |
|---|---|---|---|---|
| 5 | 0.71 | 0.75 | ··· | 0.61 |
| 10 | 0.97 | 1.02 | ··· | 0.91 |
| ⋮ | ⋮ | ⋮ | ··· | ⋮ |
| 100 | 1.52 | 1.56 | ··· | 1.49 |
| ⋮ | ⋮ | ⋮ | | ⋮ |

PRINTING APPARATUS FOR PERFORMING QUALITY CONTROL OF PRINTED PAPER SHEET

BACKGROUND OF THE INVENTION

1. Field of the Invention

The present invention relates to a printing apparatus including an ink supply device such as an ink duct device. Particularly the present invention relates to a technique for performing quality control on printed paper sheet in the printing apparatus.

2. Description of the Background Art

A typical offset printing apparatus includes a plurality of ink duct (or ink fountain) devices having ink keys, and independently controls the ink duct devices to adjust the amount of ink supplied to respective segments extending across a predetermined feed direction of a printed paper sheet. This controls the amount of ink in accordance with the area of an image on a printing plate. With a conventional printing apparatus as described above, an operator suitably takes a sample from printed paper sheets, measures the printed density and printed color of each of the regions of the sample sheet on a separately provided table for use in measurement, and effects feedback control of the amount of ink supplied to each of the regions, based on the measurements.

However, the above-mentioned process, which is based on the premise that the operator performs sampling inspection, reduces inspection frequency, and might potentially result in omission of inspection of some samples during printing because of the absence of the operator. In such a situation, if an unexpected or sudden problem arises from, for example, an excessive or insufficient supply of ink, the detection of the problem is delayed.

To solve the above-mentioned problem, a printing apparatus known in the art comprises a measuring device for measuring printed materials. Provision of the measuring device in the printing apparatus allows approximately real-time ink supply control, to drastically reduce the burdens on the operator.

Recently, there has been a growing understanding of the quality control of printed materials, and the demands of clients for product quality has been increasing. The printing apparatus comprising the above-mentioned measuring device is capable of effecting ink supply control based on measurement data, but does not further utilize the measurement data.

SUMMARY OF THE INVENTION

The present invention is intended for a printing apparatus including an ink supply device such as an ink duct device.

According to the present invention, the printing apparatus for applying ink to a printing medium while feeding the printing medium in a predetermined feed direction, thereby to provide a printed sheet, comprises: an ink supply mechanism for individually supplying a designated amount of ink through a plurality of ink transfer mechanisms to a plurality of regions defined on the printing medium to obtain a printed sheet, each of the regions extending in the feed direction; an image reader provided in a feed path of printed sheets for capturing an image on a sample sheet selected among the printed sheets to obtain image data; an computation device for processing the image data to compute measurement data about the sample sheet for each of the regions; a controller for controlling the image reader to read image data and controlling the computation device to compute measurement data from the obtained image data while intermittently selecting the sample sheet among the printed sheets; and a storage element for storing the measurement data for each of the regions in association with printing history information.

Storing the measurement data including a printed density in association with the number of printed sheets or time allows history management to be performed on the measurement data accurately and easily.

Preferably, the printing apparatus further comprises an output device visually outputting the measurement data in a historical form.

Preferably, in the printing apparatus, the computation device is operable to compute representative data including at least one of a maximum value, a minimum value and an average value of the measurement data, whereby the output device visually outputs a result of computation performed by the computation device.

It is therefore an object of the present invention to provide a printing apparatus capable of using (displaying or printing) measurement data as history data for quality control to satisfy a requirement.

These and other objects, features, aspects and advantages of the present invention will become more apparent from the following detailed description of the present invention when taken in conjunction with the accompanying drawings.

DESCRIPTION OF THE PREFERRED EMBODIMENTS

Description of Printing Apparatus

Figure 1A:
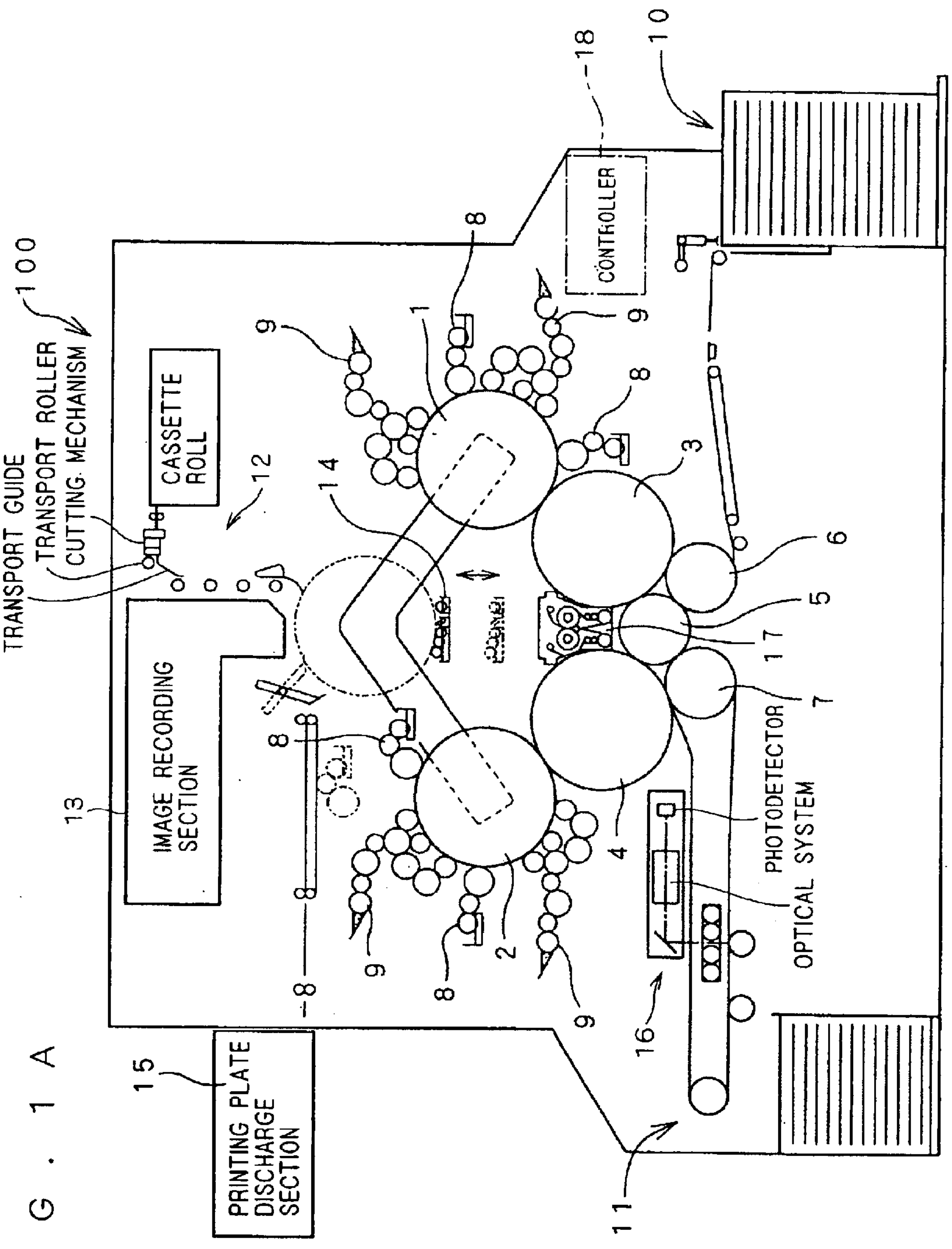
FIG. 1A is a schematic view of an example of a printing apparatus according to a preferred embodiment of the present invention.

A printing apparatus 100 according to a preferred embodiment of the present invention will now be described with reference to the drawings. FIG. 1A is a schematic view of an example of the printing apparatus 100. Referring first to FIG. 1A, the printing apparatus 100 comprises, as a printing mechanism: first and second plate cylinders (or ink transfer mechanisms) 1 and 2 for holding printing plates; first and second blanket cylinders 3 and 4 for transfer of an ink image from the respective plate cylinders 1 and 2 thereto; an impression cylinder 5 for holding a paper sheet (or a printing medium) p to be printed to which the ink image is transferred from the blanket cylinders 3 and 4; a paper feed cylinder 6 and a paper discharge cylinder 7 for feeding and discharging the sheet p to and from the impression cylinder 5; dampening water supply mechanisms 8 and ink supply mechanisms 9 for supplying dampening water and ink, respectively, to the printing plates on the first and second plate cylinders 1 and 2; a paper feed section 10 for sequentially feeding unprinted paper sheets p arranged in a stacked relation; and a paper discharge section 11 for sequentially receiving printed paper sheets p to form a stack.

As a prepress (or plate making) mechanism, the printing apparatus 100 comprises: a printing plate supply section 12 for supplying unexposed printing plates to the first and second plate cylinders 1 and 2; an image recording section 13 for recording an image on the printing plates held on the plate cylinders 1 and 2; a development section 14 for developing the printing plates with the image recorded thereon; and a printing plate discharge section 15 for discharging used printing plates.

The printing apparatus 100 further comprises an image reader 16 for capturing an image on the printed sheet p to measure an image density; a cleaning device 17 for cleaning the blanket cylinders 3 and 4; and a controller 18 for controlling the overall printing apparatus 100.

The parts of the printing apparatus 100 will be described in detail. The first plate cylinder 1 is movable by a plate cylinder drive mechanism not shown between a first printing position shown by a solid line in FIG. 1A and an image recording position shown by a dash-double dot line. Likewise, the second plate cylinder 2 is movable by a plate cylinder drive mechanism not shown between a second printing position shown by a solid line in FIG. 1A and the image recording position shown by the dash-double dot line. Specifically, the first and second plate cylinders 1 and 2 are in the first and second printing positions, respectively, when a printing process is performed, and are alternately located in the image recording position when a prepress (or plate making) process is performed on the printing plates held on the plate cylinders 1 and 2. Each of the first and second plate cylinders 1 and 2 has a peripheral surface capable of holding thereon two printing plates for two respective colors, and includes a pair of gripping mechanisms for fixing the printing plates, respectively, in circumferentially opposed positions 180 degrees apart from each other on the peripheral surface.

The first blanket cylinder 3 is adapted to rotate in contact with the first plate cylinder 1 in the first printing position. Likewise, the second blanket cylinder 4 is adapted to rotate in contact with the second plate cylinder 2 in the second printing position. The first and second blanket cylinders 3 and 4 are approximately equal in diameter to the first and second plate cylinders 1 and 2, and have a blanket mounted on their peripheral surface for transfer of ink images of two colors from each of the plate cylinders 1 and 2.

The impression cylinder 5 has a diameter approximately one-half the diameter of the first and second plate cylinders 1 and 2, and is adapted to rotate in contact with both of the first and second blanket cylinders 3 and 4. The impression cylinder 5 includes a gripping mechanism capable of holding the single sheet p having a size corresponding to that of the printing plate. The gripping mechanism is opened and closed in predetermined timed relation by an opening/closing mechanism not shown to grip a leading end of the sheet p.

The paper feed cylinder 6 and the paper discharge cylinder 7 are approximately equal in diameter to the impression cylinder 5, and each includes a gripping mechanism (not shown) similar to that of the impression cylinder 5. The gripping mechanism of the paper feed cylinder 6 is positioned to pass the sheet p in synchronism with the gripping mechanism of the impression cylinder 5, and the gripping mechanism of the paper discharge cylinder 7 is positioned to receive the sheet p in synchronism with the gripping mechanism of the impression cylinder 5.

The first and second plate cylinders 1 and 2 in the first and second printing positions, the first and second blanket cylinders 3 and 4, the impression cylinder 5, the paper feed cylinder 6 and the paper discharge cylinder 7 are driven by a printing driving motor not shown to rotate in synchronism with each other. In the printing apparatus 100, since the plate cylinders 1 and 2 and the blanket cylinders 3 and 4 have a circumference approximately twice greater than that of the impression cylinder 5, the impression cylinder 5 rotates two turns each time the plate cylinders 1 and 2 and the blanket cylinders 3 and 4 rotate one turn. Thus, two turns of the impression cylinder 5 with the sheet p held thereon effect multicolor printing using two colors from the first plate cylinder 1 and two colors from the second plate cylinder 2 or a total of four colors.

Two dampening water supply mechanisms 8 are provided for each of the plate cylinders 1 and 2 in the first and second printing positions, and are capable of selectively supplying the dampening water to the two printing plates on each of the plate cylinders 1 and 2. Each of the dampening water supply mechanisms 8 includes a water fountain for storing the dampening water, and a set of dampening water rollers for drawing up the dampening water from the water fountain to pass the dampening water to a printing plate surface. At least some of the set of dampening water rollers which contact the printing plate surface are brought into and out of contact with a plate cylinder surface by a cam mechanism. The dampening water supply mechanisms 8 need not be provided if the printing plates are of the type which requires no dampening water.

Figure 1B:
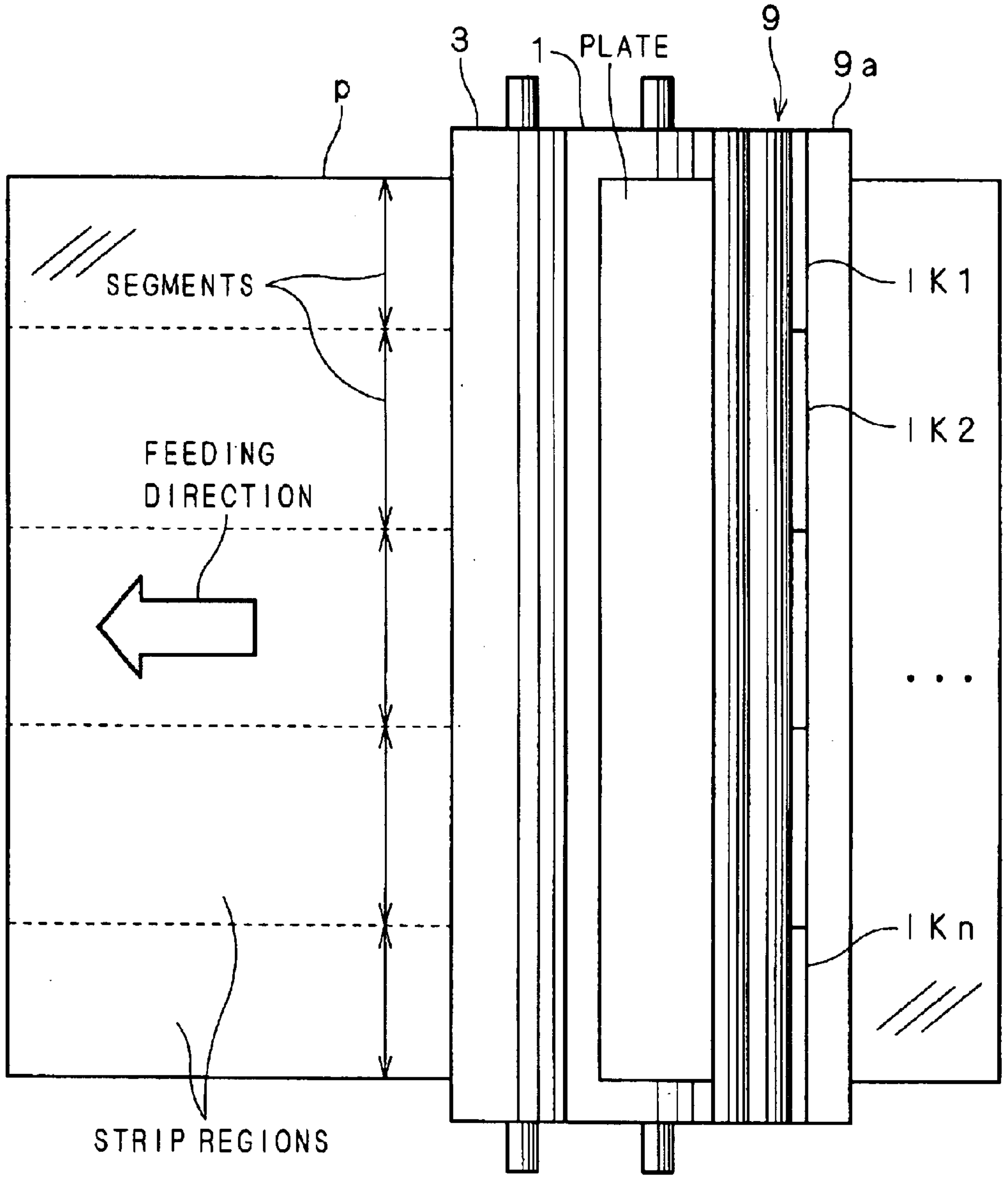
FIG. 1B is a schematic plan view illustrating transfer of ink from an ink supply mechanism to a print sheet.

Two ink supply mechanisms 9 are provided for each of the plate cylinders 1 and 2 in the first and second printing positions, and are capable of selectively supplying inks of different colors to the two printing plates on each of the plate cylinders 1 and 2. As illustrated in FIG. 1B, each of the ink supply mechanisms 9 includes an ink duct or ink fountain 9*a* capable of adjusting the amount of ink supply for each strip region extending in a predetermined feed direction (or forward direction) of the paper sheet p, and supplies the ink from the ink ducts through a plurality of ink rollers onto the printing plate surface on each of the plate cylinders 1 and 2. At least some of the ink rollers which contact the printing plate surface are brought into and out of contact with the plate cylinder surface by a cam mechanism. The ink duct 9*a* is provided with a plurality of ink keys IK1, IK2, . . . IKn. Respective amounts of ink supplied to a linear array of segments defined across the feed direction on the print paper p are independently adjusted by respective ink keys IK1, IK2, . . . IKn, whereby the ink density on respective strip regions on the print paper p are controlled. Only the part including the plate cylinder 1 and the blanket cylinder 2 is illustrated in FIG. 1B, and that including the plate cylinder 3 and the blanket cylinder 4 in FIG. 1A has a similar configuration.

The inks in the ink supply mechanisms 9 are, for example, such that the ink supply mechanisms 9 for K (black) and M (magenta) colors are provided for the first plate cylinder 1, and the ink supply mechanisms 9 for C (cyan) and Y (yellow) colors are provided for the second plate cylinder 2.

At least some of the dampening water supply mechanisms 8 and ink supply mechanisms 9 which lie on the paths of movement of the first and second plate cylinders 1 and 2 are adapted to be shunted out of the paths of movement as the first and second plate cylinders 1 and 2 move.

The paper feed section 10 feeds paper sheets p, one at a time, from a stack of unprinted paper sheets p to the paper feed cylinder 6. In this preferred embodiment, the paper feed section 10 operates so that one paper sheet p is fed each time the paper feed cylinder 6 rotates two turns. The paper discharge section 11 receives printed paper sheets p from the paper discharge cylinder 7 to form a stack. The paper discharge section 11 includes a known chain transport mechanism for discharging and carrying a printed paper sheet p, with the leading end of the printed paper sheet p gripped by a gripper (or gripper finger) carried around by a chain. The image reader 16 is provided at some midpoint in the path of movement of the printed sheets p discharged by the paper discharge section 11.

Next, the prepress mechanism of the printing apparatus 100 will be described. In the printing apparatus 100, the first and second plate cylinders 1 and 2 are alternately moved to the image recording position during the execution of the prepress process. In this image recording position, a friction roller not shown is driven to rotate in contact with the plate cylinder 1 or 2.

The printing plate supply section 12 includes a cassette roll for storing a roll of unexposed printing plate while shielding the roll of unexposed printing plate from light, a transport roller and a transport guide for transporting the printing plate unwound from the cassette roll to the plate cylinder 1 or 2, and a cutting mechanism for cutting the printing plate into sheet form. In this preferred embodiment, a silver halide sensitive material is used for the printing plate, and laser light is used to record an image on the printing plate. The procedure of a printing plate supply operation includes: causing one of the gripping mechanisms not shown of the plate cylinder 1 or 2 to grip the leading end of the printing plate unwound from the cassette roll; rotating the plate cylinder 1 or 2 in this condition to wind the printing plate around the plate cylinder 1 or 2; then cutting the printing plate to length; and causing the other gripping mechanism to grip the trailing end of the printing plate.

The image recording section 13 turns on/off laser light to expose a printing plate to the light, thereby recording an image on the printing plate. In this preferred embodiment, the controller 18 determines the position of the image on the printing plate, and sends corresponding image data to the image recording section 13. The image recording section 13 effects main scanning with the laser light emitted from a laser source in the axial direction of the plate cylinder 1 or 2 by using a polarizer such as a polygon mirror, while effecting sub-scanning over the printing plate surface by rotating the plate cylinder 1 or 2. The method of scanning may be of the type such that a plurality of laser sources are arranged in the axial direction of a plate cylinder and main scanning is carried out with a plurality of laser beams emitted from the respective laser sources as the plate cylinder rotates. The printing plate and the image recording section 13 are not limited to those of the type such that an image is recorded by exposure to light, but may be of the type such that an image is thermally or otherwise recorded.

The development section 14 develops the printing plate exposed by the image recording section 13. In this preferred embodiment, the development section 14 draws up a processing solution stored in a processing bath by using a coating roller to apply the processing solution to the printing plate, thereby developing the printing plate. The development section 14 includes an elevating mechanism for moving between a position in which the development section 14 is shunted from the plate cylinder 1 or 2 and a position in which the development section 14 is closer to the plate cylinder 1 or 2. The development section 14 itself need not be provided if an image recording method which requires no development is employed.

In the printing apparatus 100, the first and second plate cylinders 1 and 2 are moved to the image recording position, in which the prepress process is performed by supplying the printing plate and then recording and developing an image. After the prepress process is completed, the first and second plate cylinders 1 and 2 are moved to the first and second printing positions, respectively, for the printing process.

The printing apparatus 100 is capable of automatically discharging the printing plate after the printing process is completed. In this preferred embodiment, the printing plate discharge section 15 includes a peeling section for peeling the printing plate from the first or second plate cylinder 1 or 2 in the image recording position, a transport mechanism for transporting the peeled printing plate, and a discharge cassette for discharging the used printing plate so transported.

Figure 2:
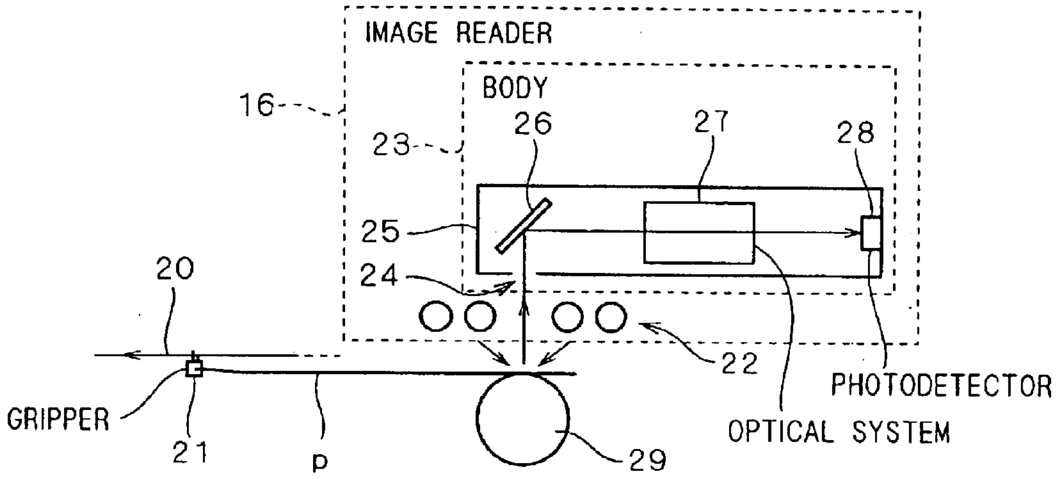
FIG. 2 is a schematic view of an image reader provided in the printing apparatus.

The details of the image reader 16 will be described with reference to the schematic view of FIG. 2. The image reader 16 reads an image on the printed paper sheet p gripped and transported by a gripper (or gripper finger) 21 carried around by a chain 20 of the paper discharge section 11. The image reader 16 includes an illuminating light source 22 for illuminating the printed paper sheet p, and a reader body 23 for receiving light reflected from the printed paper sheet p to convert the reflected light into an image signal.

The illuminating light source 22 includes a plurality of line light sources, e.g. fluorescent lamps, arranged in the feed direction of the printed paper sheet p. The reader body 23 includes a cover 25 formed with a permeable portion 24 for allowing the reflected light to pass therethrough, a reflecting mirror 26 provided in the cover 25, an optical system 27, and a photodetector 28.

The cover 25 blocks out disturbance light, dirt, ink mist and the like. The permeable portion 24 may be closed by using a light-permeable member or the like, or may be open. If the permeable portion 24 is open, it is preferable that a clean air from outside the printing apparatus 100 is introduced into the interior of the cover 25 to prevent dirt from entering the interior of the cover 25 through the permeable portion 24. The reflecting mirror 26 directs incident light from the printed paper sheet p toward the photodetector 28. The optical system 27 includes an optical member such as a lens for image-forming the incident light on the photodetector 28. The photodetector 28 includes a CCD line sensor for reading the printed image, line by line extending in a direction crosswise to the feed direction of the sheet p. This preferred embodiment employs a three-line CCD capable of reading three wavelengths for R, G and B.

The printed paper sheet p transported by the gripper 21 is vacuum-held and transported by a vacuum suction roller 29. This suppresses fluttering of the sheet p during image reading to stabilize the sheet p.

Figure 6:
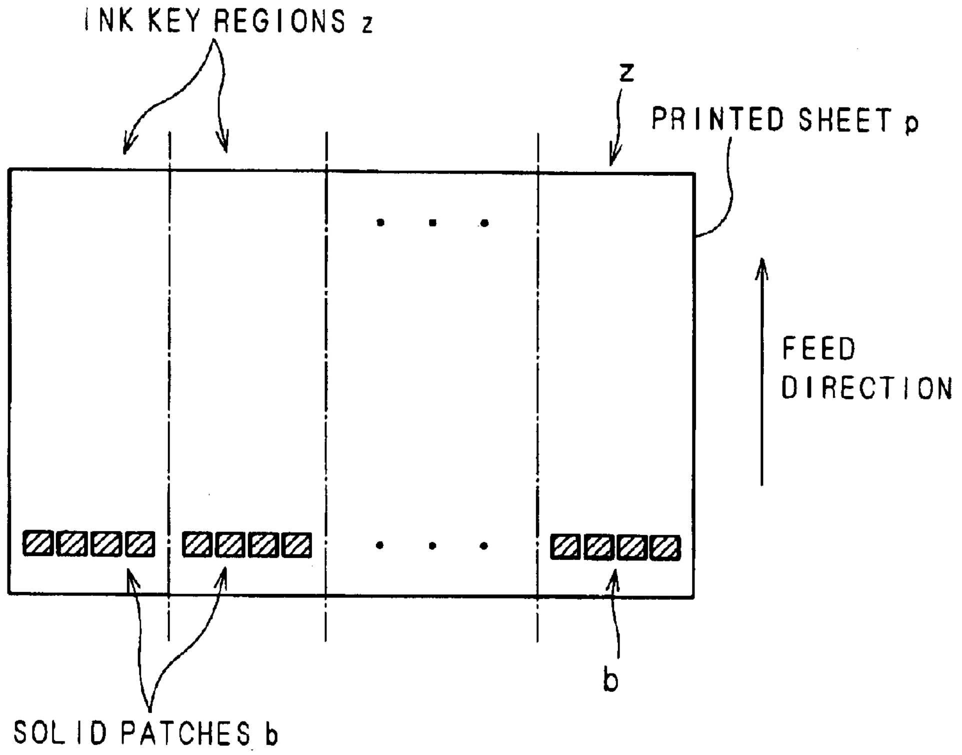
FIG. 6 illustrates an example of solid patches applied to a printed sheet.

It is desirable that the printed paper sheet p has a predetermined color chart previously formed thereon by the image recording section 13 for each of the regions (ink key regions z) corresponding to respective ink keys. As a typical example shown in FIG. 6, 100% dense solid patches b for respective CMYK colors are formed in an image end portion (typically, on the trailing end of the printed paper sheet p) in each of the ink key regions z. The image reader 16 is capable of imaging the solid patches b to measure the printed densities in the respective ink key regions z. The printed density as used herein refers to an optical reflectance density, for each of the RGB colors, which is measured by the use of a predetermined filter. For each of the YMCK colors, a target printed density to provide a standard printed color on a printed sheet is specified based on the reflectance density of the 100% dense solid patch of each ink. (The standard value thereof in Japan is specified as Japan color.) Other examples of the color charts includes other-than-100% dense halftone dot patches, line patches, and mixed color patches such as gray patches, which may be prepared and used to measure the printed densities and colorimetric densities. If the color charts and the like are not provided, the image reader 16, of course, may capture the printed image itself and measure the printed density and printed color of a predetermined region.

The cleaning device 17 comes in contact with the blanket cylinders 3 and 4 to clean the cylinder surfaces. In this preferred embodiment, individual cleaning devices are provided respectively for the blanket cylinders 3 and 4. The cleaning device 17 includes a cleaning solution supply mechanism, and a wiping mechanism using a cleaning cloth (or wiper).

The controller 18 is a microcomputer system including various input/output sections and storage sections, and is contained in the printing apparatus 100. The controller 18 controls the overall printing apparatus 100 based on a predetermined program operation, and also functions as a computation device for performing a computing process upon an image read by the image reader 16.

The controller 18 also controls the image reader 16. Specifically, the controller 18 controls the image reader 16 to intermittently read an image on a printed paper sheet (sample sheet) p once for every preset number of printed paper sheets. In this preferred embodiment, the image reader 16 periodically performs the reading and measuring operation once for every five sheets p. This frequency is substantially unattainable without provision of a measuring device in the printing apparatus 100.

For the computing process, the controller 18 computes desired measurement data from the image data obtained by the image reader 16. In this preferred embodiment, the controller 18 converts RGB image data obtained by the image reader 16 into YMCK image data based on a known transformation. This provides the printed density for each YMCK color of the solid patch provided in each ink key region z. Of course, an RGB-to-Lab conversion, rather than the RGB-to-YMCK conversion, may be performed to produce a Lab colorimetric density.

Figures 3, 4:
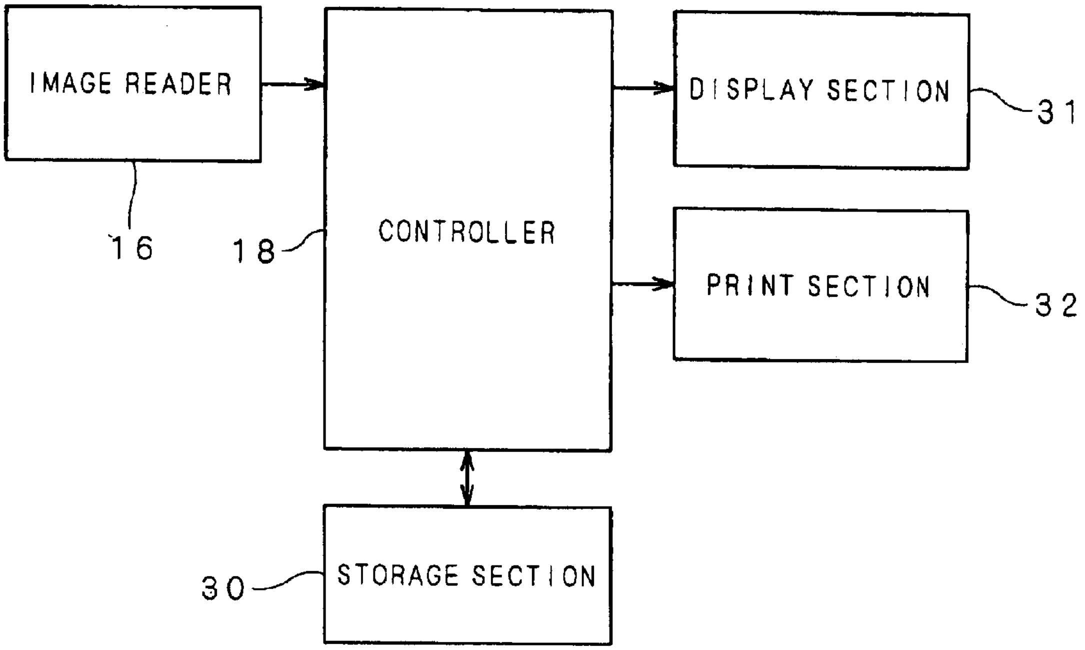
FIG. 3 is a block diagram of principal parts of the printing apparatus according to the present invention.
FIG. 4 illustrates an example of measurement data stored in association with the number of printed sheets.

FIG. 3 is a block diagram of the printing apparatus 100 according to the preferred embodiment. With reference to FIG. 3, the controller 18 is connected to the image reader 16, a storage section 30, a display section 31, and a print section 32. The image reader 16 captures an image for every predetermined number of printed paper sheets which is set by an input section not shown, and the controller 18 computes measurement data such as the printed density from the obtained image data. The measurement data are stored in the storage section 30 including a hard disc, a memory and the like. In this process, the measurement data are stored in association with the number of printed paper sheets as printing history information for each predetermined ink key region z and for each predetermined color. Thus, the measurement data stored in the storage section 30 are represented in tabular form an example of which is shown in FIG. 4. In FIG. 4, keys 1 to n denote identifiers indicating the respective ink key regions z.

Figure 5:
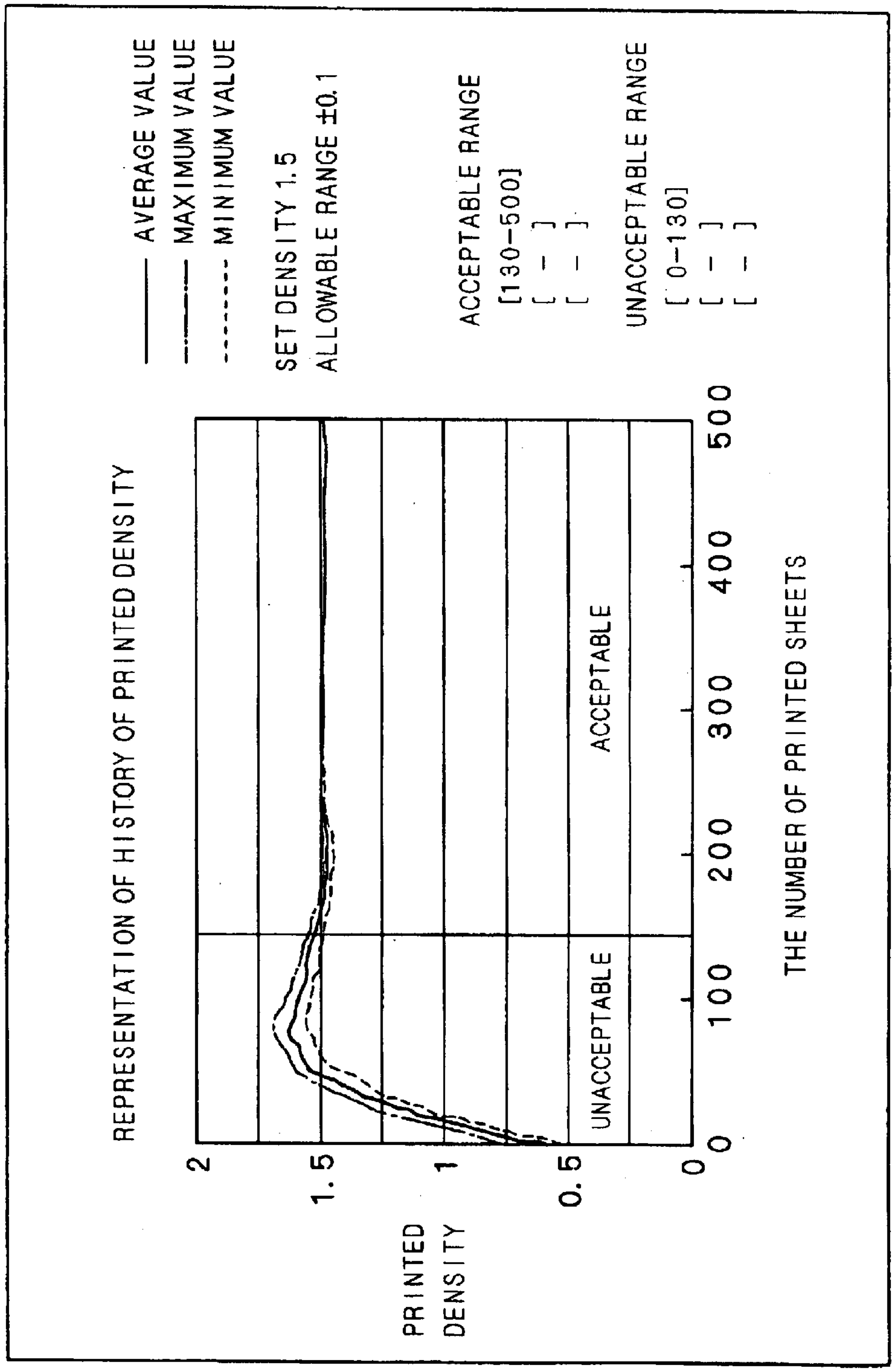
FIG. 5 illustrates an example of a graphical representation of a history of measurement data.

The display section 31 is a CRT monitor, an LCD monitor or the like, and is capable of displaying the measurement data stored in the storage section 30 based on the number of printed sheets. For instance, FIG. 5 is a graphic representation of a printed density history based on the measurement data shown in FIG. 4. The vertical axis in FIG. 5 represents the printed density, and the horizontal axis represents the number of printed sheets. FIG. 5 additionally shows the range of defective printed paper sheets based on the measured density. In the example shown in FIG. 5, the first to the 130th printed paper sheets p have printed densities which fall outside a set density range of 1.5 ±0.1 and hence are defective. Such information is displayed as quality control information.

The print section 32 includes a typical character printer, a plotter or the like, and is capable of printing the graph of FIG. 5 displayed by the display section 31 and the measurement data of FIG. 4 themselves. The display section 31 and the print section 32 need not be attached to the printing apparatus 100, but may be provided at a location remote from the printing apparatus 100 if data transmission therebetween is available. In general, an output device capable of visually outputting the measurement data in a historical form may be employed.

In this example, the printing apparatus 100 can completely reproduce the measurement data history during the printing process to provide more accurate data than, for example, measurements obtained by the conventional sampling inspection. The printed output of the measurement data may be used as quality assurance data for a client without being processed.

Other Preferred Embodiments (1) Although the storage section 30 stores the measurement data in association with the number of printed paper sheets, the measurement data may be stored in association with processing time (or lapsed time for printing). In other words, the printing history information includes a print serial number substantially identifying the sample sheet among the printed sheets, or a time value substantially representative of time at which the sample sheet is subjected to the printing process.

(2) The controller 18 may not only compute the measurement data such as the printed density but also produce various manipulated data including a maximum value, a minimum value, an average value, a deviation, and the like from the measurement data. Of course, the manipulated data may be displayed by the display section 31 or printed by the print section 32.

(3) The measurement data used herein may include the colorimetric density of a printed paper sheet, besides the printed density. For example, a L*a*b* colorimetric density and the like may be determined from the RGB image data obtained by image capturing of a gray color (a mixture of colors) which is important in terms of color management, and be subjected to history management. Additionally, an estimate of the amount of dampening water may be computed from the measured density of the printed paper sheet and stored as the measurement data. For example, a method of judging whether or not the amount of dampening water is proper as measurement data from the measured density is disclosed in Japanese Patent Application No. 2001-94697 (U.S. patent application Ser. No. 10/102808).

(4) The controller 18 may compare the measurement data with a previously set value to judge whether or not the corresponding printed paper sheet is acceptable. The controller 18 may make this judgment in real time in step with measurement of the printed paper sheet p, and cause the display section 31 to inform an operator about the result of the judgment. Of course, data indicating whether or not the printed paper sheet is acceptable may be managed as a history.

Figure 7:
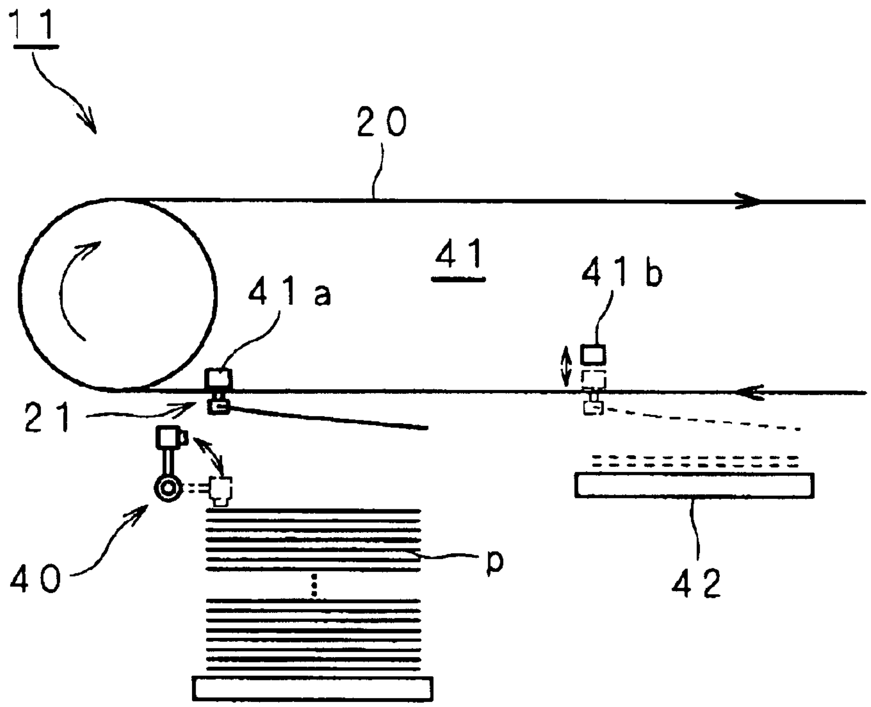
FIG. 7 is a schematic view of an example of a marking mechanism for defective printed sheets and an example of a discharge path changing mechanism for discharging defective printed sheets.

The printing apparatus 100 may comprise a mechanism for marking a sample sheet or a printed sheet, if rejected as a result of the above-mentioned judgment, to indicate that it is a defective printed sheet or for changing a printed sheet discharge path so that the printed sheet is suitably discharged to a different discharge section. FIG. 7 is a schematic view showing such a marking mechanism 40 and a discharge path changing mechanism 41 as provided in the paper discharge section 11. Although both of the marking mechanism 40 and the discharge path changing mechanism 41 are shown in FIG. 7, only one of the mechanisms 40 and 41 may be actually mounted in the paper discharge section 11.

With reference to FIG. 7, the marking mechanism 40 affixes a stamp or a sticker (or label) for marking a defective onto the surface of a stack of printed sheets p. The marking mechanism 40 includes an arm pivotable, for example, by a motor, and a stamp or sticker affixing section at the tip of the arm. It is desirable that the marking is provided at an end of the printed sheet p so that an operator can identify the marking when viewed sideways.

The discharge path changing mechanism 41 in this preferred embodiment includes two cam mechanisms 41*a* and 41*b* for opening the gripper 21. The cam mechanism 41*a* is a fixed cam for normally opening/closing the gripper 21, and the cam mechanism 41*b* is a selective cam selectively brought into operation by the controller 18. For instance, if a sample sheet or a printed sheet measured by the image reader 16 is judged as defective, the selective cam 41*b* may be brought into operation to discharge the printed sheet p to a defective discharge section 42. If a printed sheet is not defective, the selective cam 41*b* is held in non-operating conditions, whereby the printed sheet p is discharged to a normal discharge position by the fixed cam 41*a*. The marking mechanism 40 and the discharge path changing mechanism 41 are illustrated for illustrative purposes only, and other techniques may be used instead.

While the invention has been described in detail, the foregoing description is in all aspects illustrative and not restrictive. It is understood that numerous other modifications and variations can be devised without departing from the scope of the invention.

What is claimed is:

1. A printing apparatus for applying ink to a printing medium while feeding said printing medium in a predetermined feed direction, thereby to provide a printed sheet, said printing apparatus comprising:

an ink supply mechanism for individually supplying a designated amount of ink through a plurality of ink transfer mechanisms to a plurality of regions defined on said printing medium to obtain a printed sheet, each of said regions extending in said feed direction;

an image reader provided in a feed path of printed sheets for capturing an image on a sample sheet selected among said printed sheets to obtain image data;

a computation device for processing said image data to compute measurement data about said sample sheet for each of said regions;

a controller for controlling said image reader to read image data and controlling said computation device to compute measurement data from the obtained image data while intermittently selecting said sample sheet among said printed sheets; and a storage element for storing said measurement data for each of said regions in association with printing history information, wherein said printing history information includes one of i) a print serial number substantially identifying said sample sheet among said printed sheets, and ii) a time value substantially representative of time at which said sample sheet is subjected to a printing process.

2. The printing apparatus according to claim 1, further comprising an output device visually outputting said measurement data in a historical form.

3. The printing apparatus according to claim 2, further comprising a comparing and judging element for comparing said measurement data with a threshold to judge whether or not said measurement data falls within a predetermined range, whereby a result of the comparison and judgement made by the comparing and judging element is visually outputted by said output device.

4. The printing apparatus according to claim 3, further comprising a making mechanism for selectively marking said sample sheet, depending on the result of the comparison and judgment.

5. The printing apparatus according to claim 3, further comprising a discharge path changing mechanism for switching a discharge path of said sample sheet, depending on the result of the comparison and judgement.

6. The printing apparatus according to claim 2, wherein said computation device is operable to compute representative data including at least one of a maximum value, a minimum value and an average value of said measurement data, whereby said output device visually outputs a result of computation performed by said ocmputation device.

7. The printing apparatus according to claim 2, wherein said output device visually outputs a graph on which change of printed density is represented with progress of printing process.

8. The printing apparatus according to claim 1, wherein said measurement data includes a printed density for each printed color component.

9. The printing apparatus according to claim 1, further comprising an image recording device for recording an image on a printing plate through which ink is transferred onto said printing medium, whereby a region having a constant density for obtaining said measurement data is recorded on said printing plate.

* * * * *